United States Patent [19]
Baynes

[11] 4,208,950
[45] Jun. 24, 1980

[54] HYDRAULIC POWER BRAKE BOOSTER

[75] Inventor: Gene P. Baynes, Kettering, Ohio

[73] Assignee: General Motors Corporation, Detroit, Mich.

[21] Appl. No.: 947,417

[22] Filed: Oct. 2, 1978

[51] Int. Cl.² ............................................. F15B 9/10
[52] U.S. Cl. ................................. 91/369 B; 60/548;
60/554; 91/391 R
[58] Field of Search ................. 60/548, 550, 552, 553,
60/554; 91/49, 369 B, 391 R, 431

[56] References Cited

U.S. PATENT DOCUMENTS

| | | | |
|---|---|---|---|
| 2,826,042 | 3/1958 | Rike | 60/550 |
| 3,209,657 | 10/1965 | Randol | 91/369 B |
| 4,107,926 | 8/1978 | Adachi | 91/369 B |
| 4,110,985 | 9/1978 | Gordon | 60/550 |
| 4,148,247 | 4/1979 | Schubert | 91/369 B |

FOREIGN PATENT DOCUMENTS 1240419  5/1967  Fed. Rep. of Germany ......... 91/369 B

*Primary Examiner*—Abraham Hershkovitz
*Attorney, Agent, or Firm*—D. D. McGraw

[57] ABSTRACT

A hydraulic brake booster having a mechanical ratio changing mechanism between the booster input rod and one of the booster valve control members. The mechanism includes reaction levers pivotally mounted on the input valve control member and on a support member so that in normal booster operation the levers operate to move the input valve control member at a faster rate than the input rod, while the levers pivot to permit direct mechanical transmission of force from the input rod through the booster when no power or insufficient power is available to operate the booster.

1 Claim, 4 Drawing Figures

HYDRAULIC POWER BRAKE BOOSTER

The invention relates to a hydraulic power brake booster and more particularly to one with a mechanical ratio changing mechanism incorporated therein.

A support sleeve is received about the input shank of the booster input rod. One end of the sleeve is exposed to atmosphere and the other end to power brake pressure in the power pressure chamber of the booster. A generally conical lever support extends to support a series of circumferentially spaced ratio levers. The inner ends of the levers are received in a groove on the booster input valve member. A spring loaded fulcrum is supported by the input rod and engages the levers intermediate their ends. The spring loading the fulcrum reacts against the support sleeve.

In normal operation of the booster, the fulcrum is moved with the input rod, and the support sleeve remains in a rearward position. Since the fulcrum acts on the levers, it causes the inner ends of the levers to move forwardly, moving the input valve member at a faster rate than the rate of movement of the input rod. Booster power pressure acts on the support sleeve to hold the sleeve in its rearward position, thereby also holding the generally conical lever support against movement.

When no power pressure is available, the support sleeve moves as the levers tilt forwardly until the input rod engages the input valve member. Thereafter the input rod moves the input valve member by direct mechanical actuation, and the master cylinder connected to the booster is mechanically operated through the booster.

IN THE DRAWINGS

Figure 1:
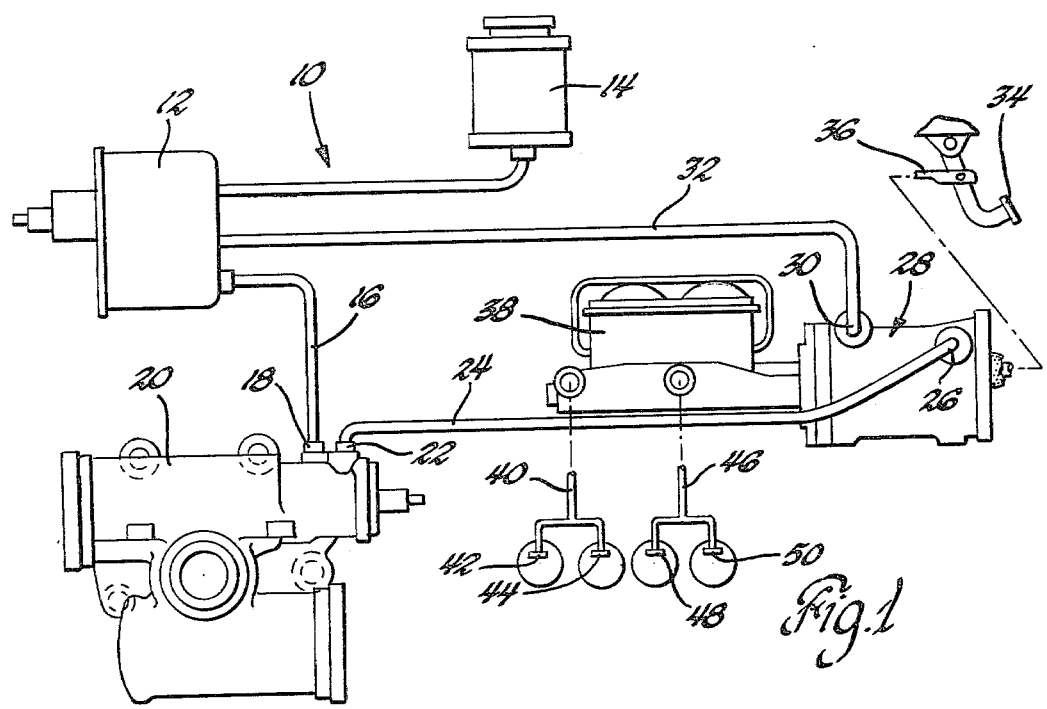
FIG. 1 is a schematic representation of a vehicle brake system having a power brake booster embodying the invention.

The brake system 10 is combined with the vehicle power steering gear system. The power steering gear pump 12 has a fluid reservoir 14. A pump output conduit 16 is connected to the input 18 of the power steering gear 20. This gear is of the open center type so that when it is not actuated there is relatively free fluid flow therethrough. The power steering gear outlet 22 has a conduit 24 connected to it and conducting fluid to the inlet 26 of the power brake booster 28. The outlet 30 of the power brake booster is connected to a conduit 32, which returns fluid to the inlet side of pump 12. The vehicle brake pedal 34 is connected by push rod 36 to actuate the brake system as will be described. The brake booster 28 has a master cylinder assembly 38 mounted thereon so that the master cylinder assembly is actuated through the booster when the brake pedal 34 is moved by the vehicle operator in an actuating direction. Master cylinder 38 is illustrated as providing brake fluid to the front brake circuit 40 containing front wheel brakes 42 and 44, and the rear brake circuit 46 containing rear wheel brakes 48 and 50.

Figure 2:
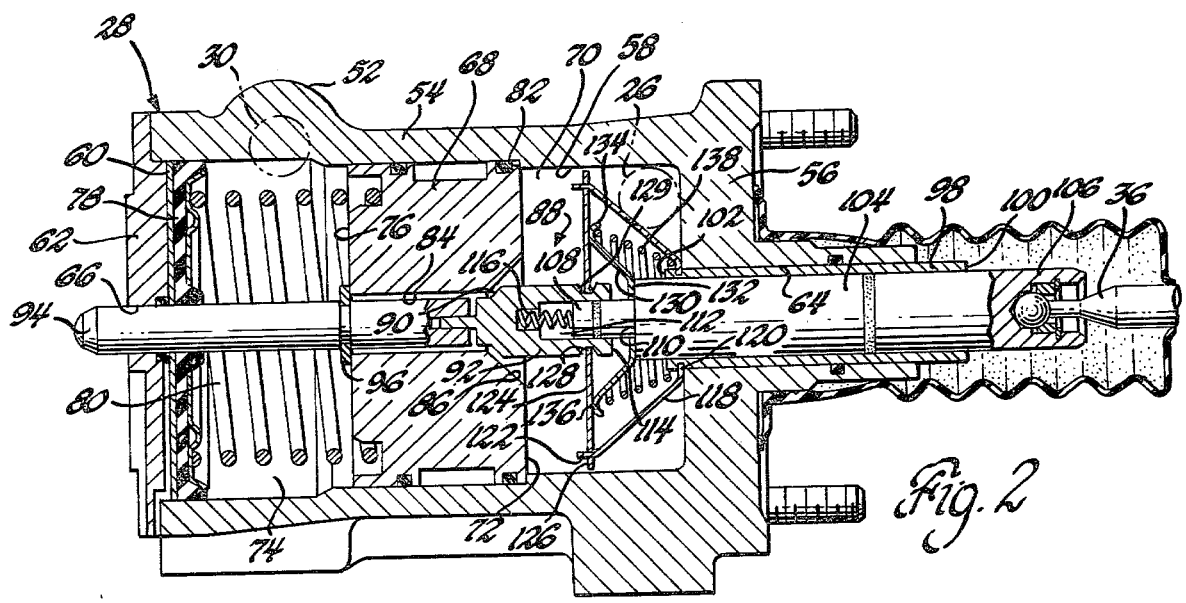
FIG. 2 is a cross section view of the power brake booster embodying the invention, with parts broken away.
Figure 3:
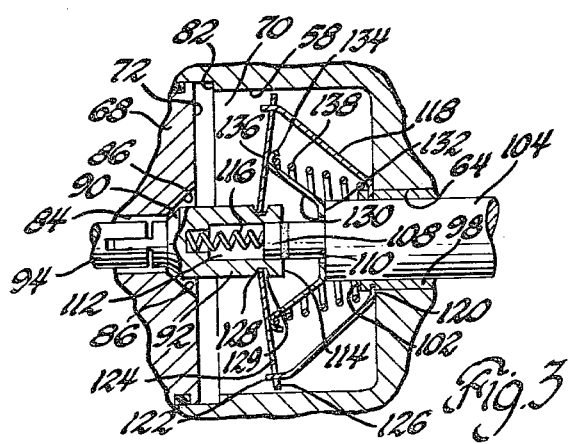
FIG. 3 is a fragmentary cross section view of the brake booster of FIG. 2, showing the mechanical ratio changing mechanism during power actuation of the booster.
Figure 4:
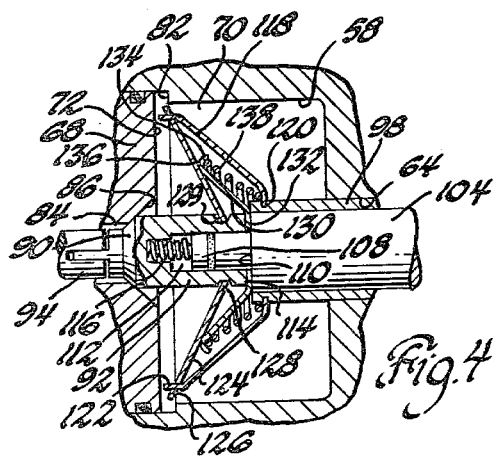
FIG. 4 is similar to FIG. 3 but shows the mechanical ratio changing mechanism when the brake system is actuated without booster power.

Booster 28 is illustrated in greater detail in FIGS. 2, 3 and 4. The booster has a housing 52 forming a cylinder wall 54 and a housing rear wall 56. A bore 58 in the cylinder housing 52 has a forward open end 60 closed by the housing end cover assembly 62. Wall 56 and end cover 62 have aligned openings 64 and 66 respectively. A power piston 68 is reciprocably and sealingly received in bore 58. Power pressure chamber 70 is defined by housing wall 56, the rearward portion of bore 58, and the rear wall 72 of power piston 68. An exhaust chamber 74 is defined by the forward wall 76 of power piston 68, the forward portion of bore 58, and housing end cover assembly 62. Assembly 62 includes a seal 78 which seals against bore 58 at its forward end 60. A piston return spring 80 is contained within chamber 74 and acts against end cover assembly 62 and the forward wall 76 of power piston 68, urging the power piston to the release position shown in FIG. 2. The shoulder 82 in bore 58 provides a stop for piston 68. Piston 68 has a passage 84 formed therethrough with the rearward end thereof being formed to provide a valve seat 86. Valve seat 86 is one valve element of the control valve 88. The input control valve element 90 is formed on the input valve member 92 and is arranged to cooperate with valve seat 86 for control valve operation. The valve input member 92 mates with the output rod 94, which extends through passage 84 with sufficient radial clearance to permit fluid flow through the control valve 88 from chamber 70 to chamber 74. A suitable force transmission member 96 is secured to the output rod 94 so that power movement of piston 68 in the actuating direction is transmitted to the output rod member 94. Force transmission member 96 is open at various places so that it does not inhibit fluid flow through passage 84.

A support sleeve 98 is reciprocably mounted through housing opening 64 so that one sleeve end 100 extends rearwardly out of the housing and is exposed to atmosphere and the other sleeve end 102 extends into the power pressure chamber 70 so as to be exposed to booster pressure in that chamber. An input rod 104 reciprocably extends through sleeve 98. The rear end 106 of rod 104 is suitably connected to push rod 36 for movement by the push rod. Rod 104 has a reduced diameter forward end 108 separated from the main body of the rod by a shoulder 110. Forward end 108 is reciprocably received in a recess 112 formed in the rear end of input valve member 92. The rear surface 114 of input valve member 92 is in alignment with shoulder 110. A compression spring 116 is positioned in recess 112 so that it urges the input valve member 92 and the input rod 104 axially apart. Suitable seals are provided to seal the sleeve 98 and the input rod 104 to prevent leakage of fluid from chamber 70.

The ratio changing mechanism includes a generally conical support member 118 which has its inner periphery 120 received in a groove formed in the outer periphery of sleeve 98 adjacent sleeve end 102. The outer periphery 122 of support member 118 extends axially relative to its inner periphery generally toward piston 68. A series of circumferentially spaced and radially extending ratio levers 124 have their outer ends 126 pivotally supported at the outer periphery 122 of the support member 118. Their inner ends 128 are pivotally supported in a groove 129 formed in the outer surface of input valve member 92 adjacent the end surface 114 of that member. A generally conical fulcrum member 130 has its inner periphery 132 receiving the reduced diameter forward end 108 of input rod 104 therethrough so that the portion of the fulcrum member adjacent the inner periphery abuts shoulder 110 and is positioned axially between that shoulder and the end surface 114 of input valve member 92. The portion of the fulcrum member 130 adjacent its outer periphery 134 is curved to provide fulcrum points 136 which engage ratio levers 124 between their ends. A compression spring 138 uses the curved outer periphery 134 of fulcrum member 130 as a spring seat for one spring end. The other spring end is seated on the inner periphery 120 of the conical support member 118 so that it operatively acts on sleeve 98 to urge that sleeve outwardly of the housing 52.

In the booster released position shown in FIG. 2 the power piston 68 is located against shoulder 82 and the mechanical ratio changing mechanism has ratio levers 124 positioned substantially perpendicular to the axis of the input rod 104 and input valve member 92. These levers engage their fulcrum points 136. Spring 138 holds sleeve 98 in the position shown, with the inner periphery 120 of conical support member engaging the housing rear wall 56. Spring 116 is not loaded sufficiently to cause the input valve member 92 to be moved forwardly relative to the input rod 104. Therefore the valve element 90 is axially spaced from the valve seat element 86 so that fluid being pumped by pump 12 passes through the brake booster without generating a power pressure in chamber 70.

The vehicle operator depresses brake pedal 34 to actuate the brake system. Movement of the brake pedal moves push rod 36 in a forward direction which is leftward as seen in the drawing, moving input rod 104 forwardly. Since the fulcrum member 130 abuts shoulder 110, the fulcrum member is also moved forwardly. Spring 138 holds sleeve 98 and the conical support member 118 is position against housing rear wall 56. Therefore the force exerted on the ratio levers 124 through the fulcrum member causes the lever inner ends 128 to move forwardly as the levers pivot about their outer ends 126. This movement causes the input valve member 92 to move forwardly with input rod 104 but at a higher rate of movement than the movement of the input rod. This condition is shown in FIG. 3. The forward movement of the input valve member 92 causes the valve element 90 to cooperate with the valve seat element 86 to restrict fluid flow through the control valve 88. This causes power pressure to be built up in power pressure chamber 70. This pressure acts on the end 102 of sleeve 98 to assist in holding the sleeve in the position shown in FIGS. 1 and 2 and also acts on the power piston rear wall 72 to move that piston forwardly against the force of piston return spring 80. The power so generated is transmitted through force transmission member 96 to the output rod 94 and the master cylinder 38 is actuated. The master cylinder pressurizes brake fluid in circuits 40 and 46 and the front and rear wheel brakes are actuated by the pressurized brake fluid.

If there is no power pressure available from pump 12 when the brake pedal 34 is depressed by the vehicle operator, the ratio changing mechanism operates in a manner described below relative to FIG. 4. Forward movement of input rod 104 moves the fulcrum member 130. This movement is transmitted to the ratio levers 124 and results in movement of the input valve member 92 until valve element 90 seats against valve seat element 86. The movement also results in an abutting action between shoulder 110 and the rear surface 114 on input valve member 92 through the inner periphery 132 of fulcrum member 130. Levers 124 have pivoted as shown in FIG. 4 to allow for such movement. Further brake pedal movement by the vehicle operator transmits force mechanically through input rod 104 to valve member 92 and output rod 94 to the master cylinder 38. Piston 68 may be a force transmission member through valve 88 and member 96 to output rod 94. The master cylinder is then actuated by the manual force so exerted.

If during power operation of the booster the power generated in pressure chamber 70 is insufficient to meet brake demand by the brake operator, additional master cylinder actuation is obtained by setting up the same mechanical force transmitting path through input rod 104 and valve member 92 so that manually exerted force can provide some additional master cylinder actuation.

What is claimed is:

1. In a hydraulic power brake booster having a housing, a power piston reciprocably movable in said housing and defining therewith a power pressure chamber, and valve means for controlling the power pressure level in said chamber for actuating and releasing said booster, said valve means including a reciprocably movable input valve control element and a cooperating valve element, the improvement comprising:
   an input rod extending into said power pressure chamber and reciprocably movable through a wall of said housing and axially aligned with said input valve control element and axially movable relative thereto;
   a sleeve around a portion of said input rod and extending through the wall of said housing so that one sleeve end is exposed to pressure in said power pressure chamber and the other sleeve end is exposed to atmospheric pressure;
   a plurality of radially extending reaction ratio levers having their radially inner ends mounted on said input control valve element for limited pivotal movement;
   an annular and generally conical lever support member in said power pressure chamber and having its inner periphery supported by and axially movable with said sleeve and having its outer periphery extending axially relative to its inner periphery and supporting the outer ends of said radially extending reaction ratio levers;
   a fulcrum member having its inner periphery abutting and reacting on said input rod and its outer periphery engaging said levers intermediate their ends and providing fulcrum points on which said levers are pivotable;
   first spring means operatively reacting on said sleeve and said fulcrum member and urging said lever support member and said sleeve axially apart from said fulcrum member and urging said fulcrum member into continuous engagement wih said levers at said fulcrum points;
   and second spring means urging said input rod and said input valve control element axially apart;
   said input rod being moved during power actuation of said booster and acting through said fulcrum member and said lever support member and said levers to move said input control valve element at a higher rate than the movement of said input rod to actuate said valve means and cause power pressure to increase in said power pressure chamber to power actuate said booster, the power pressure in said chamber acting on said sleeve to inhibit axially inward movement of said sleeve and said lever support member;

said input rod moving said fulcrum member to pivot said levers on said input valve control member to move said lever support member and said sleeve at a higher rate than the movement of said input rod when no power pressure increase occurs upon actuating movement of said input rod, until said input rod abuts and moves said input valve control member concurrently therewith to establish a mechanical force transmittal path through said booster.

* * * * *